No. 690,019. Patented Dec. 31, 1901.
H. L. DE ZENG, Jr.
TELESCOPE.
(Application filed May 28, 1900.)
(No Model.)
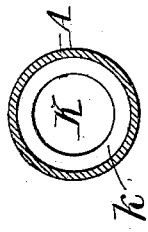
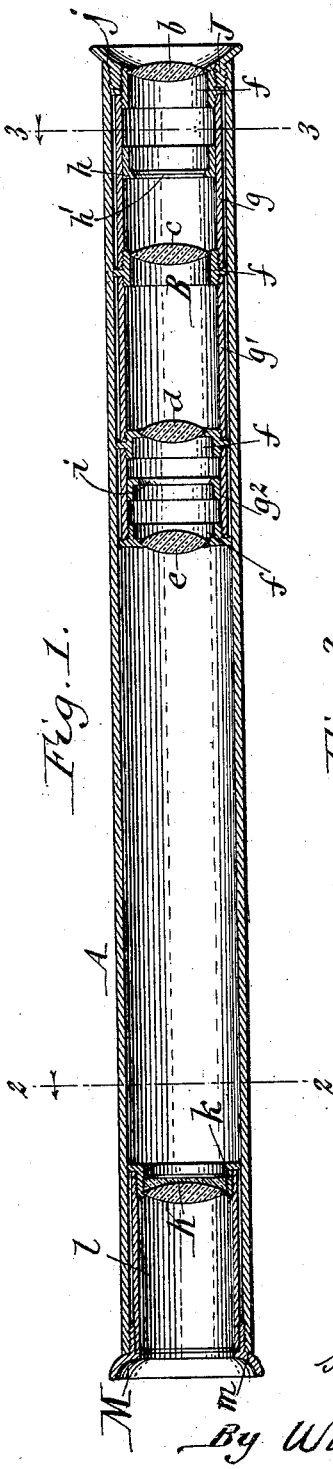
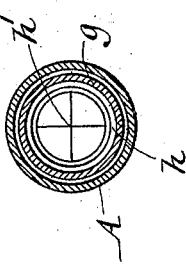
THE NORRIS PETERS CO., PHOTO-LITHO., WASHINGTON, D. C.

UNITED STATES PATENT OFFICE.

HENRY L. DE ZENG, JR., OF BUFFALO, NEW YORK, ASSIGNOR TO THE CATARACT TOOL AND OPTICAL COMPANY, OF BUFFALO, NEW YORK.

TELESCOPE.

SPECIFICATION forming part of Letters Patent No. 690,019, dated December 31, 1901.

Application filed May 28, 1900. Serial No. 18,183. (No model.)

*To all whom it may concern:*

Be it known that I, HENRY L. DE ZENG, Jr., a citizen of the United States, residing at Buffalo, in the county of Erie and State of New York, have invented new and useful Improvements in Telescopes, of which the following is a specification.

This invention relates to telescopes which are more particularly designed for use on guns to enable marksmen to sight objects at long ranges.

In the telescopes heretofore used in connection with guns the different parts of the eyepiece and objective were secured in the main tube by screws or other fastenings arranged in openings in the side of the tube. This is objectionable, because dust and water, as well as oblique light, are liable to enter the tube through the openings which receive the fastenings, and thereby interfere with the efficiency of the telescope.

The object of this invention is to provide a telescope for guns in which the main tube is imperforate throughout and the eyepiece and objective are secured only in the ends of the main tube, thereby rendering the telescope dust and water proof and also preventing the admission of oblique light into the main tube.

In the accompanying drawings, Figure 1 is a longitudinal section of my improved telescope. Figs. 2 and 3 are transverse sections thereof in lines 2 2 and 3 3, Fig. 1, respectively.

Like letters of reference refer to like parts in the several figures.

A represents the main tube or body of the telescope, which is not provided with lateral perforations or openings of any kind, but is imperforate throughout its whole length.

The eyepiece B of the telescope is provided with the desired number of lenses or glasses, according to the purpose for which the telescope is intended. As shown in the drawings, Fig. 1, the eyepiece is provided with an eye-lens $b$, which is arranged at the rear end of the eyepiece, a field-lens $c$, arranged in front of the eye-lens, and two erecting-lenses $d$ $e$, arranged one ahead of the other in front of the field-lens. Each of these lenses is secured in a tubular cell $f$, and the several cells are connected with each other by screw-threaded tube-sections $g$ $g'$ $g^2$. A diaphragm $h$, provided with cross-hairs $h'$, is arranged in the rear tube-section $g$ between the eye-lens and field-lens, and a plain diaphragm $i$ is arranged in the front tube-section between the erecting-lenses.

J represents a rear coupling-head, which is arranged on the rear end of the eyepiece and whereby the latter is rigidly connected with the rear end of the main tube. The coupling-head may be secured to the rear ends of the eyepiece and the main tube in any suitable manner, preferably by an internal screw-thread arranged on the coupling-head and engaging with an external thread on the rearmost cell of the eyepiece and by an external screw-thread on the coupling-head engaging with an internal thread in the rear end of the main tube. The eyepiece is applied to the main tube by introducing the sectional tube supporting the cells and having the coupling-head attached thereto into the rear end of the main tube and then screwing the coupling-head into the rear end of the tube until an external shoulder $j$ on the coupling-head bears firmly against the rear end of the main tube, thereby securely connecting the eyepiece with the rear end of the main tube and forming a tight joint between the rear ends of the main tube and eyepiece, which effectually prevents dust and water from entering the main tube at the rear end thereof. The connecting-tube sections $g$ $g'$ $g^2$ are preferably smaller than the bore of the main tube; but the lens-cells fit snugly into the bore of the main tube, so as to hold the cells securely against lateral displacement in the main tube.

K represents the objective lens of the telescope, which is secured in a cell $k$, arranged in the front end of the main tube. This lens is arranged a sufficient distance from the front end of the main tube to protect the objective from injury and also exclude oblique light. The cell of the objective lens fits snugly into the bore of the main tube, so as to hold the same against lateral displacement, and is secured by a screw-joint to the rear end of a supporting-tube $l$. The latter is secured at its front end to the front end of the main tube by a front coupling-head M. This head is provided with an internal screw-thread which engages with an external thread on the front end of the objective tube *l* and with an external thread which engages with an internal thread on the front end of the main tube. The front head is provided with a shoulder *m*, which bears firmly against the front end of the main tube when the objective is applied thereto and whereby dust and water are prevented from entering the main tube through the front end thereof.

The lenses are shaped in a well-known manner, so as to produce a practically universal focus and do not require readjustment for different marksmen or for different ranges.

By thus maintaining the main tube of the telescope intact and firmly securing the eyepiece and objective to opposite ends thereof removal of the lenses for cleaning the same is rendered unnecessary, owing to the absolute exclusion of dust and water from the interior of the telescope, thereby rendering the telescope serviceable at all times. Furthermore, all possibility of admitting oblique light into the interior of the telescope and interfering with the operation of the telescope is eliminated, owing to the absence of any openings in the side of the main tube.

I claim as my invention—

1. In a telescope, the combination of a main tube and an eyepiece composed of a coupling-head tightly secured in the rear end of said tube, lens-cells bearing against the inner side of the main tube, and tube-sections which connect the lens-cells with the coupling-head and clear the inner side of the main tube, substantially as set forth.

2. In a telescope, the combination of a main tube and an objective composed of a coupling-head tightly secured in the front end of said tube, a supporting-tube which extends inwardly from said head and clears the inner side of the main tube, and a lens-cell secured to the inner end of said supporting-tube and bearing against the inner side of the main tube, substantially as set forth.

Witness my hand this 18th day of May, 1900.

HENRY L. DE ZENG, JR.

Witnesses:
 THEO. L. POPP,
 CLAUDIA M. BENTLEY.